US011664523B2

(12) United States Patent
Kim

(10) Patent No.: US 11,664,523 B2
(45) Date of Patent: May 30, 2023

(54) SECONDARY BATTERY

(71) Applicant: Samsung SDI Co., Ltd., Yongin-si (KR)

(72) Inventor: Dae Kyu Kim, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 112 days.

(21) Appl. No.: 16/771,634

(22) PCT Filed: Dec. 13, 2017

(86) PCT No.: PCT/KR2017/014613
§ 371 (c)(1),
(2) Date: Jun. 10, 2020

(87) PCT Pub. No.: WO2019/117342
PCT Pub. Date: Jun. 20, 2019

(65) Prior Publication Data
US 2020/0358047 A1 Nov. 12, 2020

(51) Int. Cl.
*H01M 50/148* (2021.01)
*H01M 50/10* (2021.01)
(Continued)

(52) U.S. Cl.
CPC ..... *H01M 10/0422* (2013.01); *H01M 50/107* (2021.01); *H01M 50/152* (2021.01);
(Continued)

(58) Field of Classification Search
CPC ............ H01M 50/147; H01M 50/148; H01M 50/0422; H01M 50/10
See application file for complete search history.

(56) References Cited

U.S. PATENT DOCUMENTS 7,501,197 B2 3/2009 Kim
8,062,786 B2 11/2011 Kim et al.
(Continued)

FOREIGN PATENT DOCUMENTS

CN 101394001 A 3/2009
CN 102210041 A 10/2011
(Continued)

OTHER PUBLICATIONS

Machine Translation of: JP 2016-126975 A, Yatomi, Jul. 11, 2016.*
(Continued)

*Primary Examiner* — Kenneth J Douyette
(74) *Attorney, Agent, or Firm* — Lewis Roca Rothgerber Christie LLP

(57) ABSTRACT

Various embodiments of the present invention relate to a secondary battery. A technical problem to be solved is to provide a secondary battery in which, when a can is compressed in a lateral direction thereof, a bending direction thereof is controlled such that a cap assembly (or a circuit interrupt device (CID)) is bent in an opposite direction of an electrode assembly and an electrical short-circuit phenomenon between the cap assembly and the electrode assembly can be thus prevented. To this end, the present invention provides a secondary battery comprising: a cylindrical can; an electrode assembly received in the cylindrical can; and a cap assembly for sealing the cylindrical can, wherein the cap assembly comprises a cap-down having a notch for inducing bending, which allows the cap assembly to be bent in an opposite direction of the electrode assembly when the cylindrical can is compressed in a direction perpendicular to a longitudinal direction of the cylindrical can.

10 Claims, 9 Drawing Sheets

(51) Int. Cl.
  *H01M 50/147* (2021.01)
  *H01M 10/04* (2006.01)
  *H01M 50/342* (2021.01)
  *H01M 50/152* (2021.01)
  *H01M 50/107* (2021.01)
  *H01M 50/574* (2021.01)

(52) U.S. Cl.
  CPC ....... *H01M 50/342* (2021.01); *H01M 50/574* (2021.01); *H01M 2200/20* (2013.01)

(56) References Cited

U.S. PATENT DOCUMENTS

| | | | |
|---|---|---|---|
| 8,497,033 B2 | 7/2013 | Chun | |
| 8,771,867 B2 | 7/2014 | Chun | |
| 8,936,861 B2 | 1/2015 | Kiyama et al. | |
| 10,090,497 B2 | 10/2018 | Kim et al. | |
| 10,622,608 B2 | 4/2020 | Ko et al. | |
| 11,088,429 B2 | 8/2021 | Lee et al. | |
| 2005/0214634 A1 | 9/2005 | Kim | |
| 2006/0216592 A1 | 9/2006 | Chun | |
| 2009/0123831 A1 | 5/2009 | Kim | |
| 2010/0086835 A1* | 4/2010 | Kim | H01M 50/3425 429/56 |
| 2010/0119935 A1 | 5/2010 | Kim et al. | |
| 2011/0206958 A1 | 8/2011 | Kiyama et al. | |
| 2013/0029211 A1 | 1/2013 | Seong et al. | |
| 2013/0309557 A1 | 11/2013 | Chun | |
| 2015/0004446 A1 | 1/2015 | Kim et al. | |
| 2015/0236334 A1* | 8/2015 | Lee | H01M 50/325 429/82 |
| 2017/0294635 A1 | 10/2017 | Kim et al. | |
| 2017/0309880 A1 | 10/2017 | Ko et al. | |

FOREIGN PATENT DOCUMENTS

| | | |
|---|---|---|
| CN | 104868065 A | 8/2015 |
| CN | 107293687 A | 10/2017 |
| CN | 107305931 A | 10/2017 |
| EP | 1 705 732 A1 | 9/2006 |
| EP | 2 551 935 A1 | 1/2013 |
| JP | 2005-243386 A | 9/2005 |
| JP | 2010-503186 A | 1/2010 |
| JP | 2010-113929 A | 5/2010 |
| JP | 2010-161023 A | 7/2010 |
| JP | 2016-126975 A | 7/2016 |
| KR | 10-2005-0095949 A | 10/2005 |
| KR | 10-2006-0065378 A | 6/2006 |
| KR | 10-2016-0034794 A | 3/2016 |
| KR | 10-2017-0012138 A | 2/2017 |

OTHER PUBLICATIONS

EPO Extended European Search Report dated May 19, 2021, issued in corresponding European Patent Application No. 17934623.4 (6 pages).

International Search Report, with English Translation, dated Nov. 28, 2018, for corresponding Korean International Application No. PCT/KR2017/014613, 5 pages.

Chinese Office action issued in corresponding application No. CN 201780098112.7, dated Feb. 23, 2022, 7 pages.

Chinese Notification of Grant of Right issued in corresponding application No. CN 2017-80098112.7, dated Aug. 3, 2022, 6 pages.

Translation of Chinese Notification of Grant of Right issued in corresponding application No. CN 2017-80098112.7, dated Aug. 3, 2022, 6 pages.

* cited by examiner

SECONDARY BATTERY

CROSS-REFERENCE TO RELATED APPLICATION(S)

This application is a National Phase Patent Application of International Patent Application Number PCT/KR2017/014613, filed on Dec. 13, 2017. The entire contents of which are incorporated herein by reference.

TECHNICAL FIELD

Various embodiments of the present invention relate to a secondary battery.

BACKGROUND ART

Lithium ion secondary batteries are being widely used in portable electronic devices and power sources of hybrid automobiles or electric vehicles because of various advantages, including a high operation voltage, a high energy density per unit weight, and so forth.

Such a secondary battery can be largely classified as a cylinder type secondary battery, a prismatic type secondary battery, a pouch type secondary battery. Specifically, the cylindrical lithium ion secondary battery generally includes a cylindrical electrode assembly, a cylindrical can coupled to the electrode assembly, an electrolyte injected into the can to allow movement of lithium ions, and a cap assembly coupled to one side of the can to prevent leakage of the electrolyte and separation of the electrode assembly.

The above information disclosed in this Background section is only for enhancement of understanding of the background of the described technology and therefore it may contain information that does not form the prior art that is already known in this country to a person of ordinary skill in the art.

DESCRIPTION OF EMBODIMENTS

Technical Problem

Various embodiments of the present invention provide a secondary battery.

Solution to Problem

According various embodiments of the present invention, provided is a secondary battery including a cylindrical can, an electrode assembly received in the cylindrical can, and a cap assembly for sealing the cylindrical can, wherein the cap assembly comprises a cap-down having a notch for inducing bending, which allows the cap assembly to be bent in an opposite direction of the electrode assembly when the cylindrical can is compressed in a direction perpendicular to a longitudinal direction of the cylindrical can.

The cap-down may include a substantially planar first surface facing the electrode assembly and a substantially planar second surface opposite to the first surface, and the bending inducing notch may be formed on the first surface.

The bending inducing notch may be formed to extend from the center of the cap-down in a radial direction.

The bending inducing notch may include 2 to 10 bending inducing notches, which are spaced apart from one another.

The cap-down may further include a gas through-hole formed between each of the bending inducing notches.

The bending inducing notch may be spaced apart from the center of the cap-down.

The bending inducing notch may be spaced apart from the periphery of the cap-down.

The bending inducing notch may be spaced apart from each of the center and the periphery of the cap-down.

The cap-down may further include a forging portion between the bending inducing notch and the periphery thereof, the forging portion having a greater width than the bending inducing notch.

The cap assembly may include a cap-up, a safety vent having a space between a lower portion of the cap-up and the cap-up, and a connection ring connected to the periphery of the safety vent, wherein the cap-down is coupled to the connection ring.

Advantageous Effects of Invention

As described above, various embodiments of the present invention provides a secondary battery in which, when a can is compressed in a lateral direction thereof, a bending direction thereof is controlled such that a cap assembly (or a circuit interrupt device (CID)) is bent in an opposite direction of an electrode assembly and an electrical short-circuit phenomenon between the cap assembly and the electrode assembly can be thus prevented.

MODE OF INVENTION

Figure 1A:
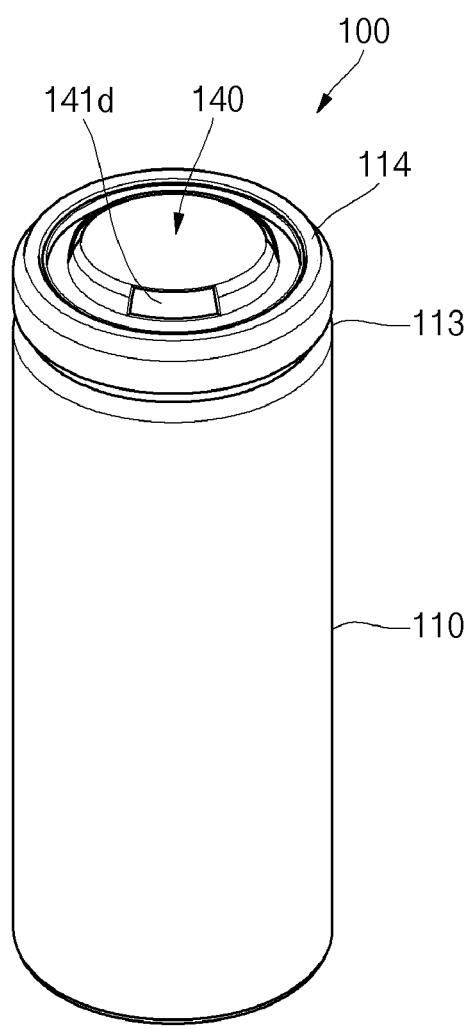
FIGS. 1A, 1B and 1C are a perspective view, a cross-sectional view and an exploded perspective view of a secondary battery according to various embodiments of the present invention.

Hereinafter, example embodiments of the present invention will be described in detail.

Various embodiments of the present invention may be embodied in many different forms and should not be construed as being limited to the example embodiments set forth herein. Rather, these example embodiments of the invention are provided so that this invention will be thorough and complete and will convey inventive concepts of the invention to those skilled in the art.

In addition, in the accompanying drawings, sizes or thicknesses of various components are exaggerated for brevity and clarity. Like numbers refer to like elements throughout. As used herein, the term "and/or" includes any and all combinations of one or more of the associated listed items. In addition, it will be understood that when an element A is referred to as being "connected to" an element B, the element A can be directly connected to the element B or an intervening element C may be present and the element A and the element B are indirectly connected to each other.

The terminology used herein is for the purpose of describing particular embodiments only and is not intended to be limiting of the invention. As used herein, the singular forms are intended to include the plural forms as well, unless the context clearly indicates otherwise. It will be further understood that the terms "comprise or include" and/or "comprising or including," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present invention.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the element or feature in use or operation in addition to the orientation depicted in the figures. For example, if the element or feature in the figures is turned over, elements described as "below" or "beneath" other elements or features would then be oriented "on" or "above" the other elements or features. Thus, the exemplary term "below" can encompass both an orientation of above and below.

Figure 1B:
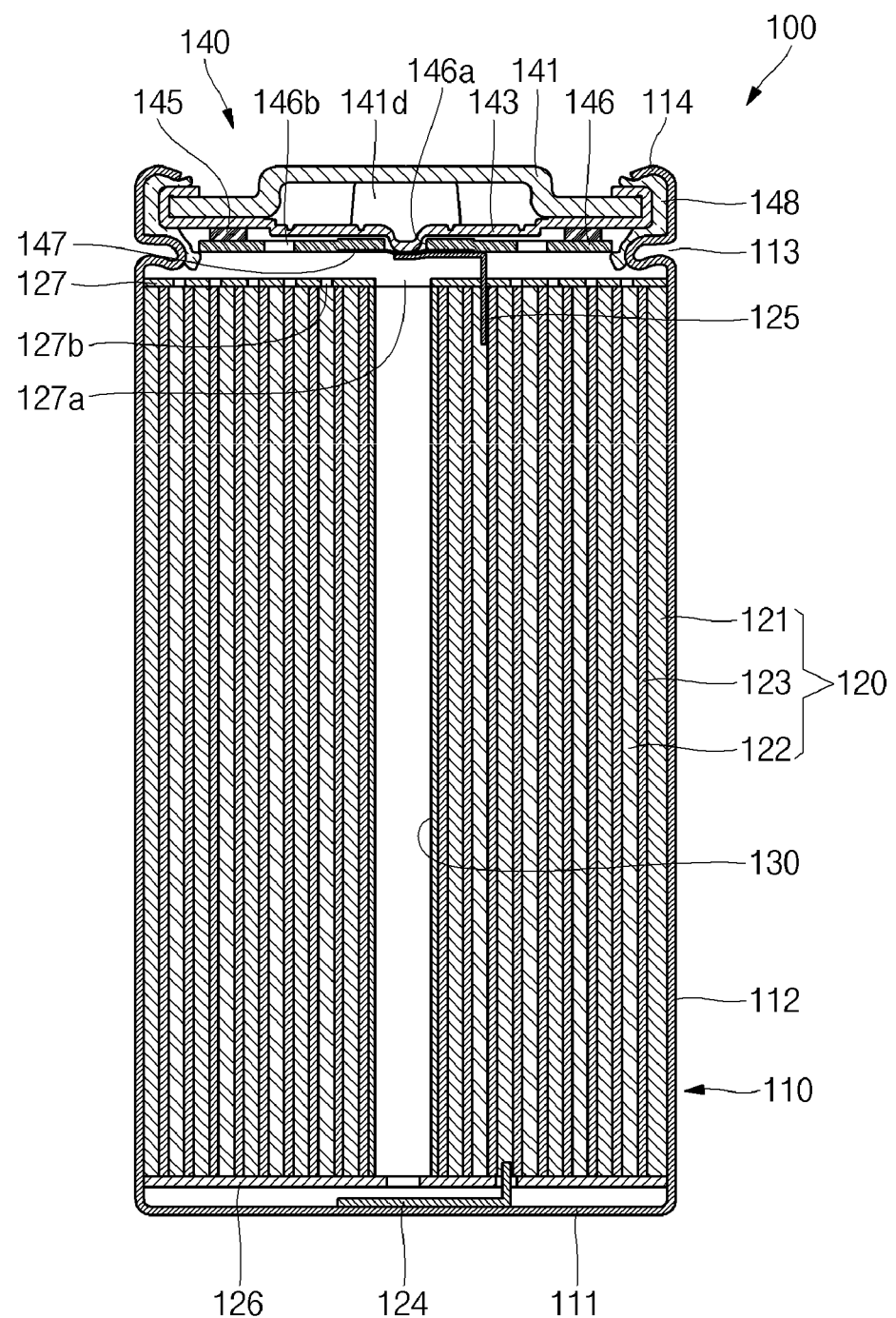
Figure 1C:
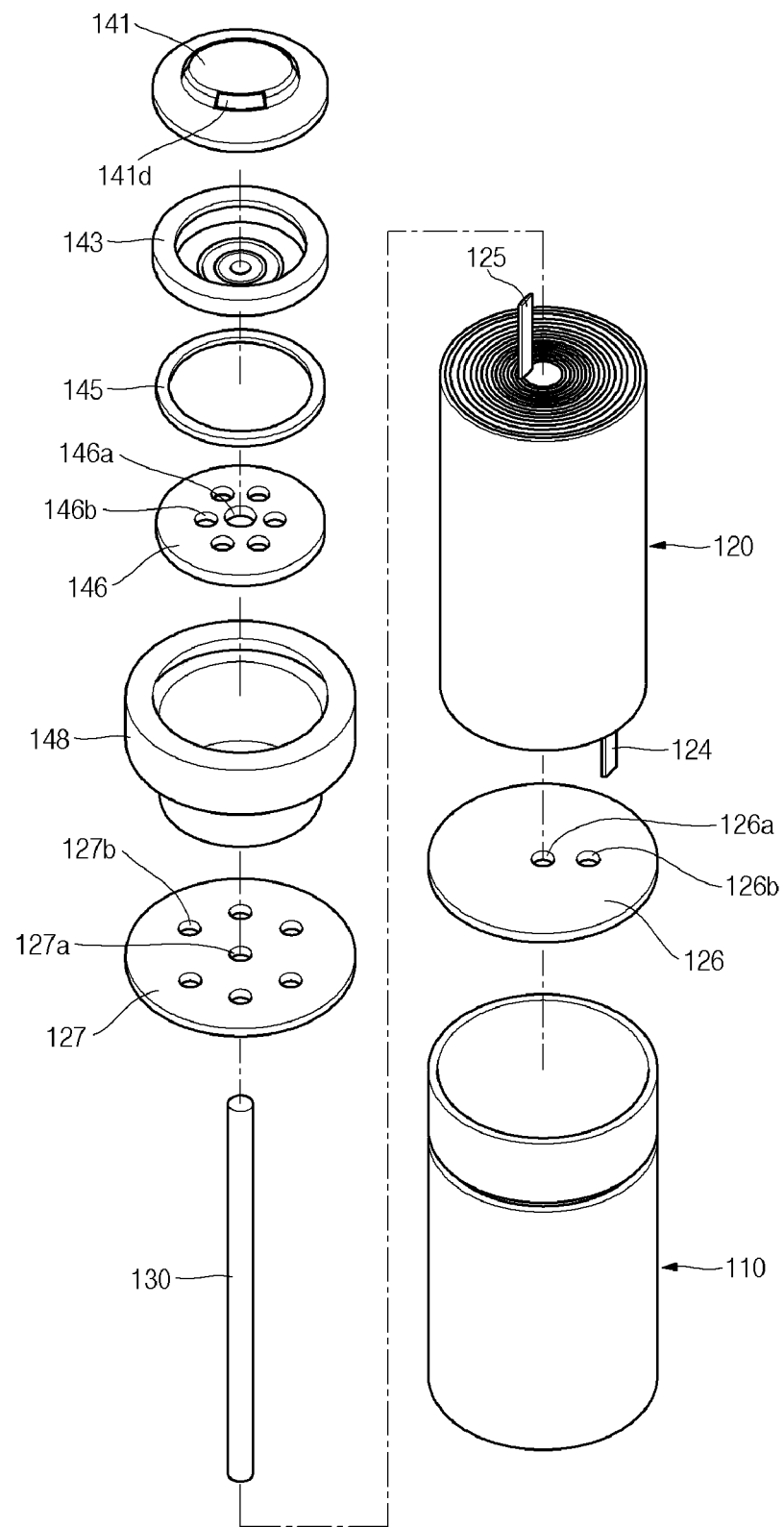

FIGS. 1A, 1B and 1C are a perspective view, a cross-sectional view and an exploded perspective view of a secondary battery according to various embodiments of the present invention.

As illustrated in FIGS. 1A, 1B and 1C, the secondary battery 100 according to the present invention includes a cylindrical can 110, an assembly 120, and a cap assembly 130. In addition, the secondary battery 100 according to the present invention may further include a center pin 130.

The cylindrical can 110 includes a circular bottom portion 111 and a side portion 112 upwardly extending a predetermined length from the bottom portion 111. In the process of manufacturing the secondary battery, a top portion or top end of the cylindrical can 110 is left open. Therefore, in the process of assembling the secondary battery 100, the electrode assembly 120 may be inserted into the cylindrical can 110 together with an electrolyte. The cylindrical can 110 may be made of steel, a steel alloy, aluminum, an aluminum alloy, or an equivalent thereof, but embodiments of the present invention are not limited thereto. In addition, an inwardly recessed beading part 113 may be formed below the cap assembly 140 to prevent the electrode assembly 120 from being separated from the cap assembly 140 and an inwardly bent crimping part 114 may be formed on or above the beading part 113.

The electrode assembly 120 is accommodated within the cylindrical can 110. The electrode assembly 120 includes a negative electrode plate 121 coated with a negative electrode active material (e.g., graphite or carbon), a positive electrode plate 122 coated with a positive electrode active material (e.g., a transition metal oxide, such as $LiCoO_2$, $LiNiO_2$, or $LiMn_2O_4$), and a separator 123 interposed between the negative electrode plate 121 and the positive electrode plate 122 to prevent a short circuit between the negative electrode plate 121 and the positive electrode plate 122 while allowing only movement of lithium ions. The negative electrode plate 121, the positive electrode plate 122, and the separator 123 are wound in a substantially cylindrical shape or configuration. Here, the negative electrode plate 121 may be formed of a copper (Cu) or nickel (Ni) foil, the positive electrode plate 122 may be formed of an aluminum (Al) foil, and the separator 123 may be made of polyethylene (PE) or polypropylene (PP); however, embodiments of the present invention are not limited thereto.

In addition, a negative electrode tab 124 may be welded to the negative electrode plate 121 to downwardly protrude and extend a predetermined length therefrom, and a positive electrode tab 125 may be welded to the positive electrode plate 122 to upwardly protrude and extend a predetermined length therefrom, or vice versa. In addition, the negative electrode tab 124 may be made of copper or nickel, and the positive electrode tab 125 may be made of aluminum; however, embodiments of the present invention are not limited thereto. In addition, the negative electrode tab 124 of the electrode assembly 120 may be welded to the bottom portion 111 of the cylindrical can 110. Therefore, the cylindrical can 110 may function as a negative electrode. In other embodiments, the positive electrode tab 125 may be welded to the bottom portion 111 of the cylindrical can 110. In these embodiments, the cylindrical can 110 may function as a positive electrode.

Additionally, a first insulation plate 126, which is coupled to the cylindrical can 110 and has a first hole 126a formed at its center and a second hole 126b formed around the first hole 126a, may be interposed between the electrode assembly 120 and the bottom portion 111 of the cylindrical can 110. The first insulation plate 126 may prevent the electrode assembly 120 from electrically contacting the bottom portion 111 of the cylindrical can 110. Specifically, the first insulation plate 126 prevents the positive electrode plate 122 of the electrode assembly 120 from electrically contacting the bottom portion 111. Here, when a relatively large amount of gas is generated due to an abnormality in the secondary battery, the first hole 126a allows the gas to rapidly move upwardly through the center pin 130, and the second hole 126b allows the negative electrode tab 124 to pass therethrough to be welded to the bottom portion 111.

In addition, a second insulation plate 127, which is coupled to the cylindrical can 110 and has a first hole 127a formed at its center and a plurality of second holes 127b formed around the first hole 127a, may be interposed between the electrode assembly 120 and the bottom portion 111 of the cylindrical can 110. The second insulation plate 127 may prevent the electrode assembly 120 from electrically contacting the bottom portion 111 of the cylindrical can 110. Specifically, the second insulation plate 127 prevents the negative electrode plate 121 of the electrode assembly 120 from electrically contacting the cap assembly 140. Here, when a relatively large amount of gas is generated due to an abnormality in the secondary battery, the first hole 127a allows the gas to rapidly move to the cap assembly 140, and the second hole 127b allows the positive electrode tab 125 to pass therethrough to be welded to the cap assembly 140. In addition, during injection of an electrolyte, the other second hole 127b allows the electrolyte to rapidly flow into the electrode assembly 120.

Additionally, since diameters of the first holes 126a and 127a of the first and second insulation plates 126 and 127 are smaller than a diameter of the center pin 130, the center pin 130 may be prevented from electrically contacting the bottom portion 111 of the cylindrical can 110 or the cap assembly 140 due to external impacts.

The center pin 130 is a hollow cylinder pipe and may be coupled to an approximately central area of the electrode assembly 120. The center pin 130 may be made of steel, a steel alloy, aluminum, an aluminum alloy, or polybutylene terephthalate; however, embodiments of the present invention are not limited thereto. The center pin 130 may suppress deformation of the electrode assembly 120 during charging and discharging of the secondary battery and may function as a movement passage for gas generated in the secondary battery. In some embodiments, the center pin 130 may not be provided.

The cap assembly 140 includes a cap-up 141 having a plurality of through-holes 141d, a safety vent 143 installed under the cap-up 141, a connection ring 145 installed under the safety vent 143, a cap-down 146 coupled to the connection ring 145 and having first and second through-holes 146a and 146b, a sub-plate 147 fixed to a lower portion of the cap-down 146 and electrically connected to the positive electrode tab 125, and an insulation gasket 148 insulating the cap-up 141 and the safety vent 143 from the side portion 112 of the cylindrical can 110.

Here, the insulation gasket 148 is pressed substantially between the beading part 113 and the crimping part 114, each of which are formed at the side portion 112 of the cylindrical can 110. In addition, the through-holes 141d formed in the cap-up 141 and the second through-hole 146b formed in the cap-down 146 may allow internal gas generated in the cylindrical can 110 to be discharged to the outside when an abnormal internal pressure is reached. In this case, the safety vent 143 upwardly inverts due to the internal pressure to be electrically separated from the sub-plate 147 and is then broken or ruptured to allow the internal gas to be discharged to the outside through the through-hole 141d of the cap-up 141.

Additionally, an electrolyte (not shown) is injected into the cylindrical can 110, and lithium ions generated by an electrochemical reaction in the negative electrode plate 121 and the positive electrode plate 122 in the secondary battery during charging and discharging are allowed to move. The electrolyte may be a non-aqueous, organic electrolyte including a mixture of a lithium salt and a high-purity organic solvent. In addition, the electrolyte may be a polymer using a polymer electrolyte or a solid electrolyte. However, embodiments of the present invention are not limited to the above electrolytes.

In the secondary battery 100 according to embodiments of the present invention, a top-end height of the cap assembly 140 may be equal to or less than that of the cylindrical can 110. That is to say, a height from the bottom portion 111 of the cylindrical can 110 to the top end of the cap-up 141 of the cap assembly 140 may be equal to or less than a height from the bottom portion 111 of the cylindrical can 110 to the top end of the crimping part 114. Therefore, the secondary battery 100 according to embodiments of the present invention can accommodate a larger electrode assembly 120 than a conventional secondary battery while having the same height as the conventional secondary battery, thereby providing a secondary battery having a relatively large capacity.

In addition, the negative electrode lead tab and the positive electrode lead tab may be welded to an approximately top portion of the secondary battery 100 according to embodiments of the present invention. In other words, the negative electrode lead tab may be electrically connected to a top end of the cylindrical can 110, that is, a top end of the crimping part 114, and the positive electrode lead tab may be electrically connected to a top end of the cap assembly 140, that is, the cap-up 141.

Accordingly, since the negative electrode lead tab and the positive electrode lead tab are both welded to the top portion of the secondary battery 100, a separate wire structure is not necessarily provided at a lower portion of the secondary battery 100 according to embodiments of the present invention. Therefore, a module structure of the lower portion of the secondary battery 100 can be simplified, thereby allowing the secondary battery 100 according to embodiments of the present invention to be used as a power source of an electric vehicle.

Figure 2A:
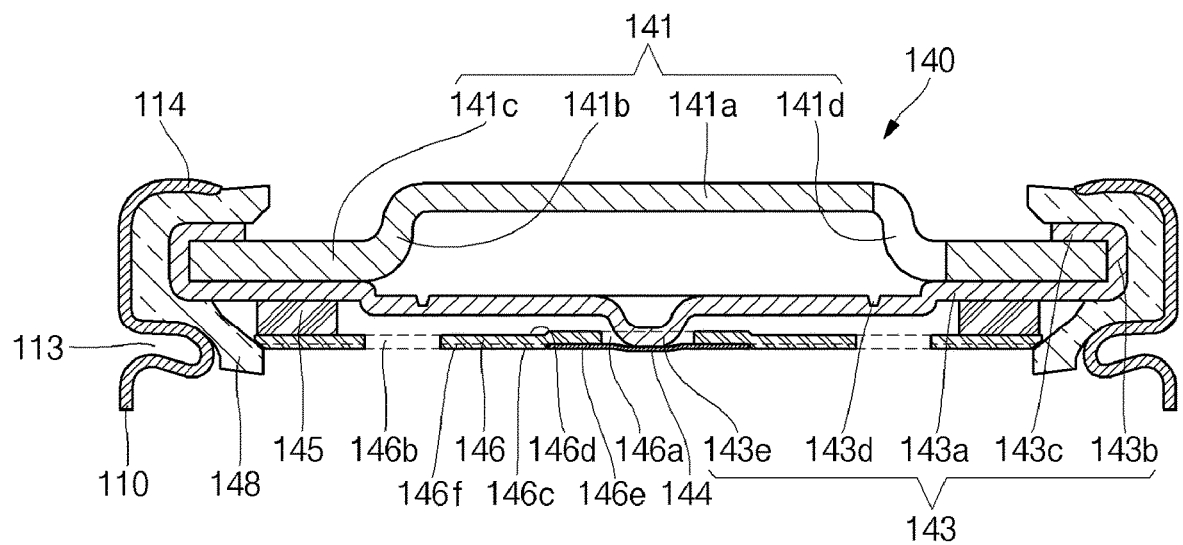
FIG. 2A is an enlarged cross-sectional view illustrating a cap assembly of the secondary battery according to various embodiments of the present invention and FIG. 2B is a cross-sectional view illustrating an example of a bending direction.
Figure 2B:
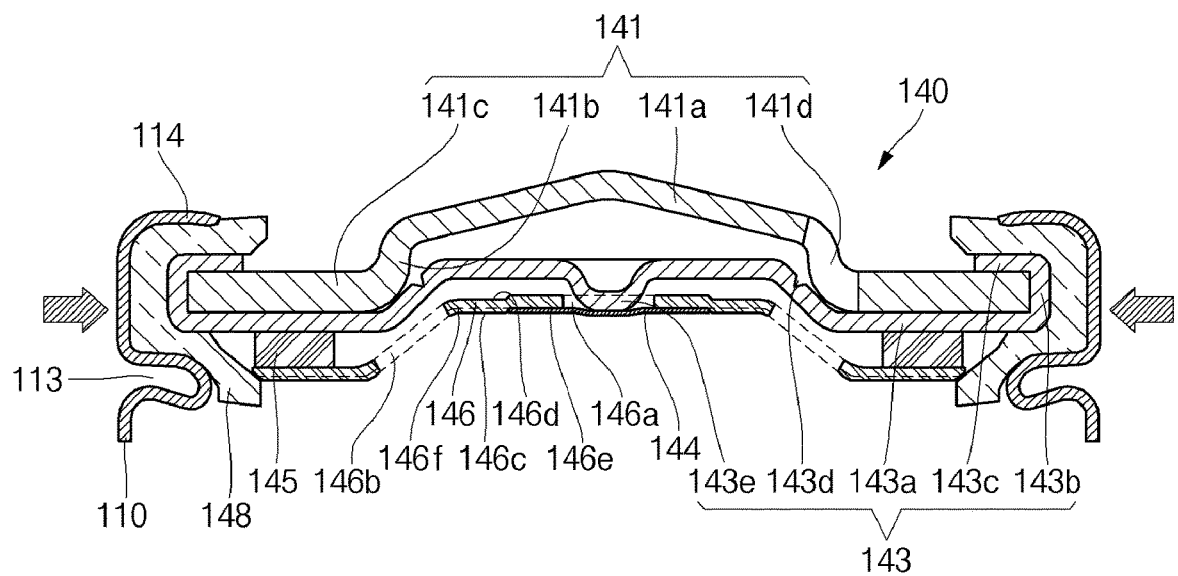

FIG. 2A is an enlarged cross-sectional view illustrating a cap assembly of the secondary battery according to various embodiments of the present invention and FIG. 2B is a cross-sectional view illustrating an example of a bending direction.

As illustrated in FIG. 2A, the cap-up 141 of the cap assembly 140 includes a terminal portion 141a, a bent portion 141b, and an extending portion 141c. The terminal portion 141a is substantially planar and is connected a positive electrode lead tab (not shown). The bent portion 141b is formed to be downwardly bent from a periphery of the terminal portion 141a and includes one or more openings or through-holes 141d. In addition, the extending portion 141c may horizontally extend outwardly from a bottom end of the bent portion 141b.

The cap-up 141 may be made of general aluminum, an aluminum alloy, steel, a steel alloy, nickel, a nickel alloy, and equivalents thereof. but embodiments of the present invention are not limited thereto.

The safety vent 143 of the cap assembly 140 includes a main body 143a, a main body bent portion 143b, and a main body extending portion 143c. The main body 143a is positioned roughly under the cap-up 141, a plurality of vent notches 143d are formed on the surface of the main body 143a, and a downwardly protruding lower protrusion 143e is roughly centrally formed to be connected to the sub-plate 144. The main body bent portion 143b is upwardly bent from the periphery of the main body 143a, and thus surrounds the periphery of the extending portion 141c of the cap-up 141. In addition, the main body extending portion 143c horizontally extends inwardly from the main body bent portion 143b, and thus covers a top surface of the extending portion 141c of the cap-up 141. That is to say, the main body extending portion 143c of the safety vent 143 covers a partial region of the extending portion 141c of the cap-up 141.

The insulation gasket 148 is positioned at the exterior side of the safety vent 143. That is to say, the insulation gasket 148 is interposed between the exterior side of the safety vent 143 and the interior side of the beading part 113/crimping part 114 of the cylindrical can 110. Therefore, leakage of the electrolyte and infiltration of external moisture may be efficiently prevented by the insulation gasket 148.

The cap-down 146 is coupled to a bottom surface of the safety vent 143 through the connection ring 145. The cap-down 146 includes a substantially planar first surface 146c and a substantially planar second surface 146d opposite to the first surface 146c. Here, the first surface 146c faces the electrode assembly 120, and the second surface 146d faces the safety vent 143 and/or the cap-up 141, which is opposite to the electrode assembly 120. Here, the first through-hole 146a and the plurality of second through-holes 146b are formed while passing through the first surface 146c and the second surface 146d. In addition, a mounting groove 146e for the sub-plate 144 may be formed around the first through-hole 146a in the first surface 146c of the cap-down 146. The mounting groove 146e may be formed by forging a roughly central portion of the first surface 146c, and a diameter of the mounting groove 146e is larger than that of the first through-hole 146a.

Here, features of the first surface 146c, the second surface 146d and the first through-hole 146b of the cap-down 146, and the mounting groove 146e are commonly applied to all embodiments of the present invention.

The cap-down 146 may further include one or more notches 146f for inducing bending (see FIG. 3A) formed on the first surface 146c. For example, the bending inducing notches 146f may be formed in a substantially radial direction about the first through-hole 146a or the sub-plate mounting groove 146e of the cap-down 146, but embodiments of the present invention are not limited thereto. The bending inducing notches 146f will be described below in more detail.

Figure 3A:
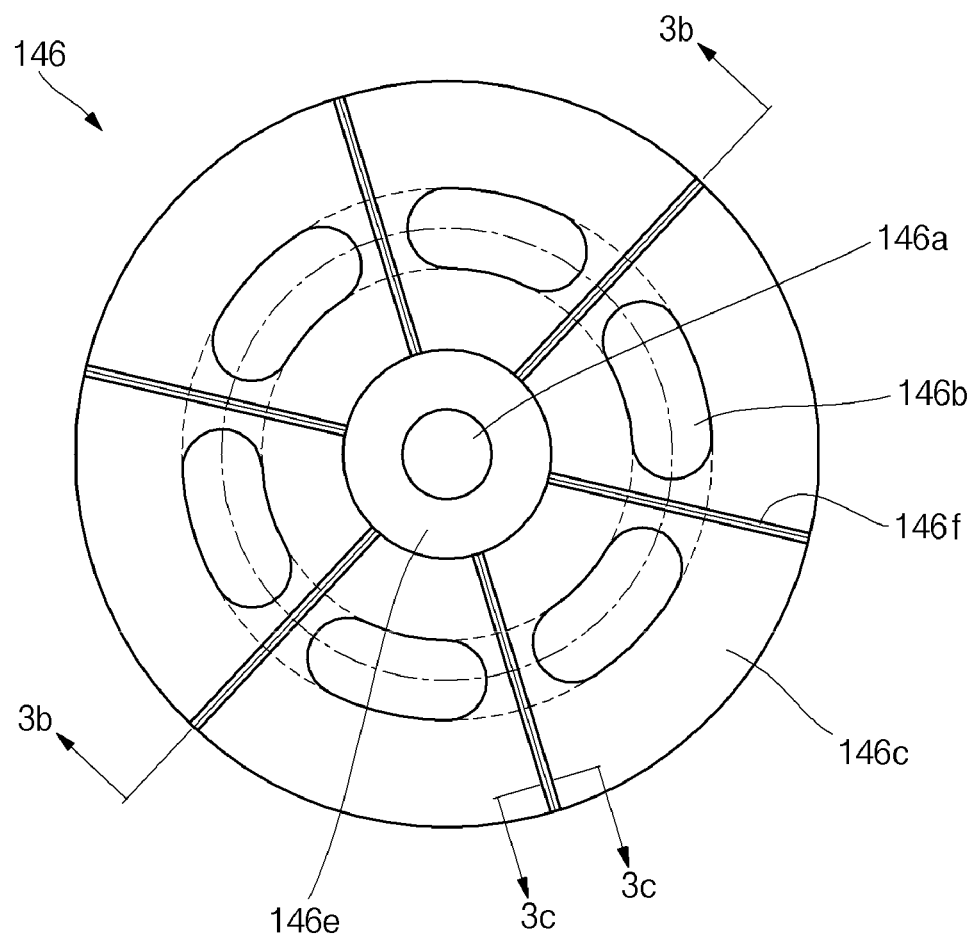
FIG. 3A is a bottom view illustrating a cap-down of the cap assembly of the secondary battery according to various embodiments of the present invention.
Figure 3B:
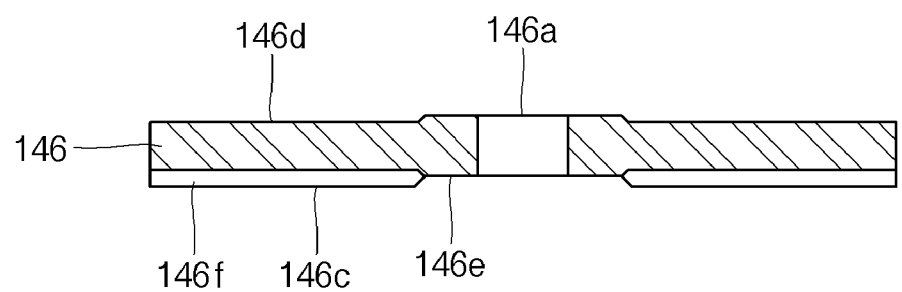
FIG. 3B is a cross-sectional view taken along the line 3b-3b of FIG. 3A.

In the secondary battery 100 according to the embodiment of the present invention, as illustrated in FIG. 3B, the cap assembly 140 is generally bent in an opposite direction of the electrode assembly 120 by the bending inducing notches 146f when the secondary battery 100 or the cylindrical can 110 is compressed in a direction substantially perpendicular to a longitudinal direction of the secondary battery 100 or the cylindrical can 110.

Therefore, an electrical short-circuit phenomenon between the cap assembly 140 (or the circuit interrupt device) and the electrode assembly 120 (specifically the negative electrode plate) can be prevented, thereby preventing a fire and/explosion of the secondary battery.

Figure 3C:
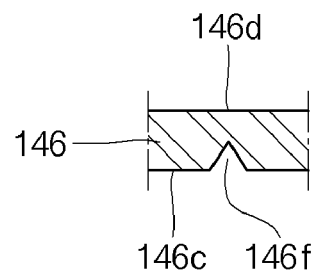
FIG. 3C is a cross-sectional view taken along the line 3c-3c of FIG. 3A.

FIG. 3A is a bottom view illustrating a cap-down 146 of the cap assembly of the secondary battery according to various embodiments of the present invention, FIG. 3B is a cross-sectional view taken along the line 3b-3b of FIG. 3A, and FIG. 3C is a cross-sectional view taken along the line 3c-3c of FIG. 3A.

As illustrated in FIG. 3A, one or more bending inducing notches 146f may be formed on the first surface 146c (i.e., the bottom surface facing the electrode assembly 120) in a substantially radial direction about the first through-hole 146a and/or the sub-plate mounting groove 146e of the cap-down 146. The one or more bending inducing notches 146f may be formed to extend in a substantially linear shape from the mounting groove 146e to the periphery of the cap-down 146. In the drawing, approximately six bending inducing notches 146f are illustrated, but embodiments of the present invention are not limited thereto. For example, approximately two to ten bending inducing notches 146f may be formed in a substantially radial direction about the first through-hole 146a and/or the sub-plate mounting groove 146e.

In addition, each of the bending inducing notches 146f may pass a region between the second through-holes 146b. For example, the bending inducing notch 146f may linearly pass across a region between two neighboring second through-holes 146b, but embodiments of the present disclosure are not limited thereto.

As illustrated in FIGS. 3B and 3C, the bending inducing notches 146f may be formed on the first surface 146c of the cap-down 146 so as to have a substantially inverted V ("Λ") shaped cross section. Each of the bending inducing notches 146f may be formed to have a depth of approximately 10% to approximately 90% of the overall thickness of the cap-down 146. If the depth of each of the bending inducing notches 146f is smaller than 10% of the overall thickness of the cap-down 146, the cap-down 146 and/or the cap assembly 140 may not be bent away from the electrode assembly 120 when the secondary battery 100 is compressed in a direction perpendicular to a longitudinal direction of the secondary battery 100. If the depth of each of the bending inducing notches 146f is greater than 90% of the overall thickness of the cap-down 146, the cap-down 146 may be easily deformed due to a small external shock.

Figure 4:
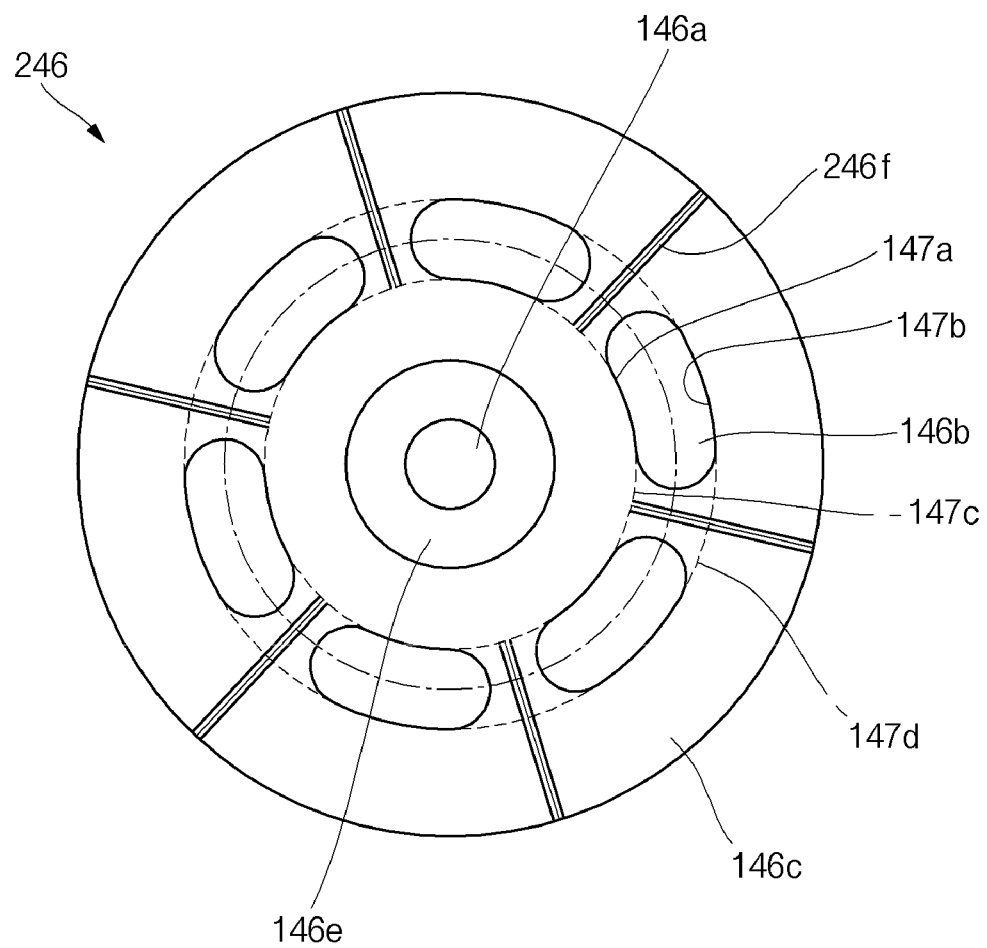
FIG. 4 is a bottom view illustrating a cap-down of a cap assembly of a secondary battery according to various embodiments of the present invention.

FIG. 4 is a bottom view illustrating a cap-down of a cap assembly 246 of a secondary battery according to various embodiments of the present invention.

As illustrated in FIG. 4, bending inducing notches 246f may be spaced a predetermined distance apart from the center of the cap-down 246 to then extend up to the periphery of the cap-down 246. That is to say, one end of each of the bending inducing notches 246f may be spaced a predetermined distance apart from a first through-hole 146a and/or a mounting groove 146e of the cap-down 246, and the other end of each of the bending inducing notches 246f may be located at the periphery of the cap-down 246.

For example, one end of each of the bending inducing notches 246f may be located at a region between second through-holes 146b formed in the cap-down 246 and may be spaced a predetermined distance apart from the first through-hole 146a and/or the mounting groove 146e of the cap-down 246, but embodiments of the present invention are not limited thereto. More specifically, a plurality of second through-holes 146b may be concentrically arranged about the first through-hole 146a. For example, interior sides 147a of the second through-holes 146b may form an inner concentric circle 147c, and exterior sides 147b of the second through-holes 146b may form an outer concentric circle 147d. Here, the bending inducing notches 246f may extend from the inner concentric circle 147c between neighboring second through-holes 146b to the periphery of the cap-down 246. In other words, one end of each of the bending inducing notches 246f may be located on the inner concentric circle 147c between the second through-holes 146b, and the other end of each of the bending inducing notches 246f may be located on the periphery of the cap-down 246.

Here, features of the second through-holes 146b having the inner concentric circle 147c and the outer concentric circle 147d can be commonly applied to all of embodiments of the present invention.

Figure 5:
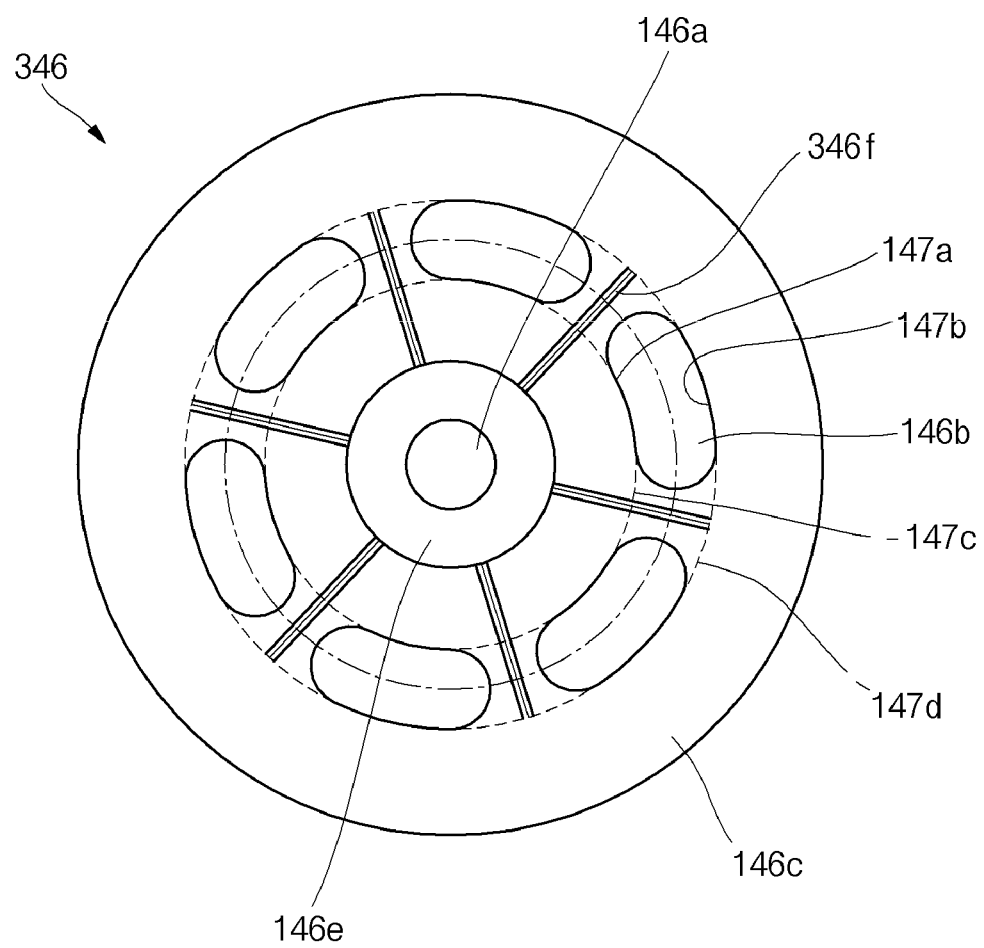
FIG. 5 is a bottom view illustrating a cap-down of a cap assembly of a secondary battery according to various embodiments of the present invention.

FIG. 5 is a bottom view illustrating a cap-down 346 of a cap assembly of a secondary battery according to various embodiments of the present invention.

As illustrated in FIG. 5, bending inducing notches 346f may extend from the center of the cap-down 346 to regions spaced a predetermined distance apart from the periphery of the cap-down 346. That is to say, one end of each of the bending inducing notches 346f may be located at a first through-hole 146a and/or a mounting groove 146e of the cap-down 346, and the other end of each of the bending inducing notches 346f may be located at the periphery of the cap-down 346.

For example, the other end of each of the bending inducing notches 346f may be located at a region between the second through-holes 146b formed in the cap-down 346 to then be spaced a predetermined distance apart from the periphery of the cap-down 346, but embodiments of the present invention are not limited thereto. More specifically, the bending inducing notches 346f may extend from the first through-hole 146a and/or the mounting groove 146e to the outer concentric circle 147d between neighboring second through-holes 146b. In other words, the one end of each of the bending inducing notches 346f may be located at the first through-hole 146a and/or the mounting groove 146e, and the other end of each of the bending inducing notches 346f may be located on the outer concentric circle 147d between the second through-holes 146b.

Although not illustrated, in the embodiment of the present invention, the bending inducing notches may be spaced apart from each of the center and the periphery of the cap-down 346. That is to say, the bending inducing notches may be formed only between the inner concentric circle 147c and the outer concentric circle 147d between the second through-holes 146b of the cap-down 346.

Figure 6:
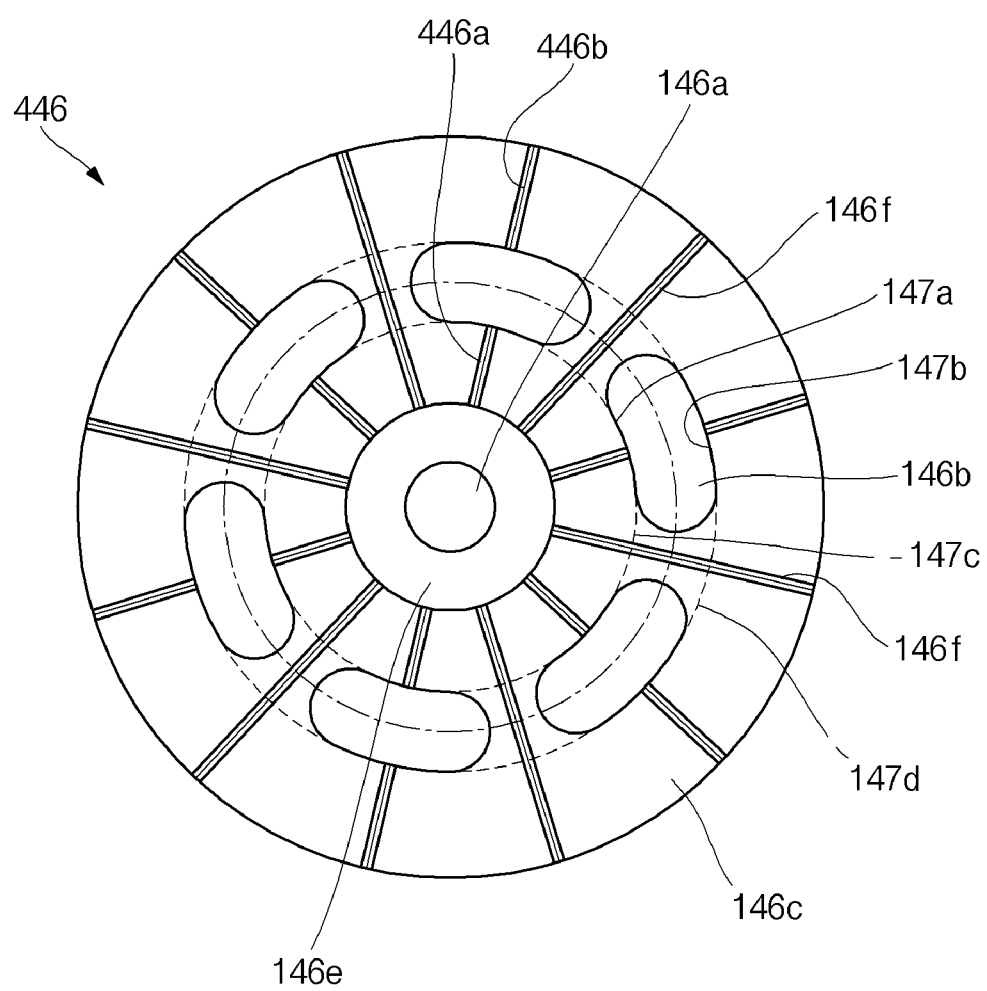
FIG. 6 is a bottom view illustrating a cap-down of a cap assembly of a secondary battery according to various embodiments of the present invention.

FIG. 6 is a bottom view illustrating a cap-down 446 of a cap assembly of a secondary battery according to various embodiments of the present invention.

As illustrated in FIG. 6, bending inducing notches 146f may extend from the center of the cap-down 446 to the periphery of the cap-down 446, and other bending inducing notches 446a and 446b may pass across second through-holes 146b. That is to say, each of one side bending inducing notches 446a may extend from a first through-hole 146a and/or a mounting groove 146e of the cap-down 446 to each of interior sides 147a of the second through-holes 146b, and each of the other side bending inducing notches 446b may extend from each of the exterior sides 147b of the second through-holes 146b to the periphery of the cap-down 446.

The disconnected bending inducing notches 446a and 446b may also be formed in a radial direction about the first through-hole 146a and/or the mounting groove 146e of the cap-down 446. Additionally, the bending inducing notches 446a and 446b separated from each other by the second through-holes 146b may be formed between the neighboring bending inducing notches 146f having a linear shape. That is to say, the bending inducing notches 146f, 446a, and 446b may be generally formed in a radial direction about the first through-hole 146a and/or the mounting groove 146e of the cap-down 446.

Figure 7A:
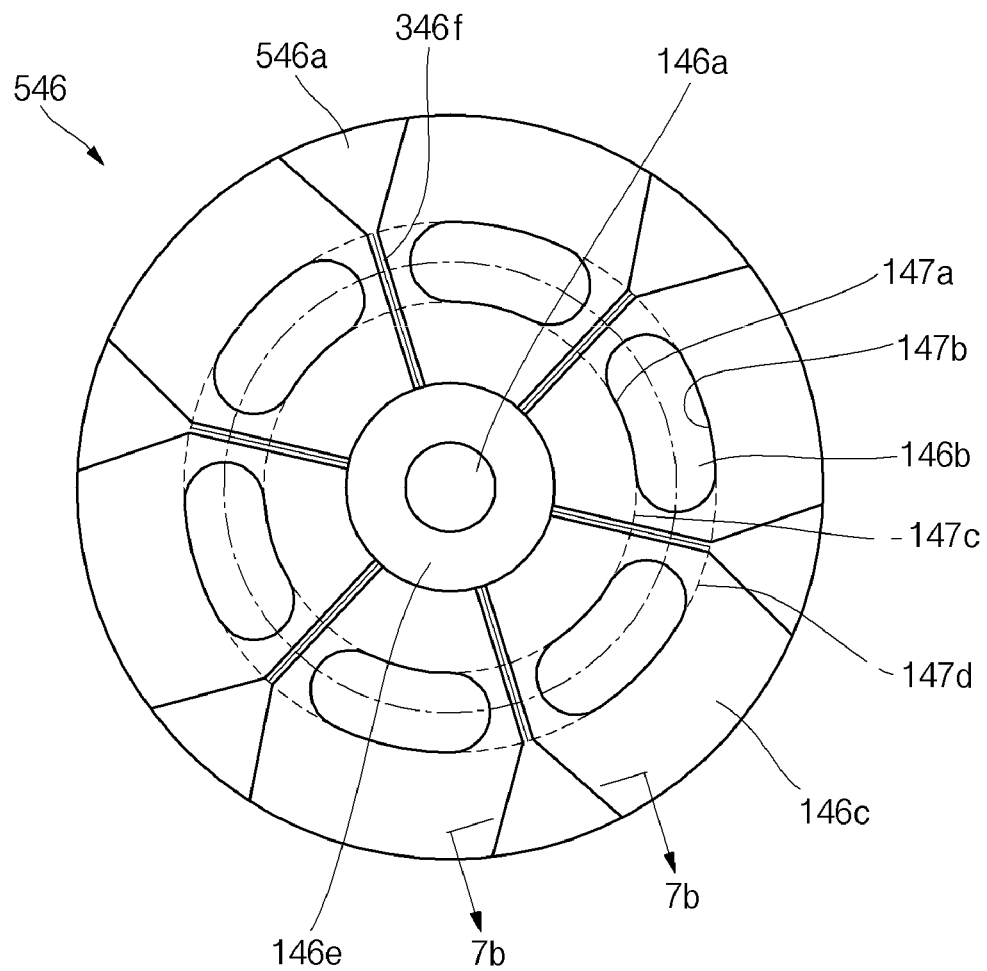
FIG. 7A is a bottom view illustrating a cap-down of the cap assembly of the secondary battery according to various embodiments of the present invention and FIG. 7B is a cross-sectional view taken along the line 7b-7b of FIG. 7A.
Figure 7B:
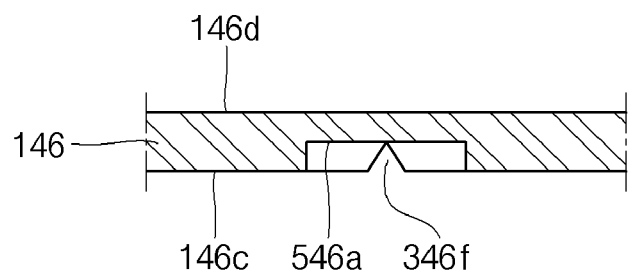

FIG. 7A is a bottom view illustrating a cap-down 546 of the cap assembly of the secondary battery according to various embodiments of the present invention and FIG. 7B is a cross-sectional view taken along the line 7b-7b of FIG. 7A.

As illustrated in FIG. 7A, the cap-down 546 according to the embodiment of the present invention may further include forging portions 546a each formed between each of bending inducing notches 346f and the periphery of the cap-down 546. That is to say, the bending inducing notches 346f may extend up to the outer concentric circle 147d between a first through-hole 146a and/or a mounting groove 146e and second through-holes 146b, and the forging portions 546a may be formed to have widths gradually increasing from the outer concentric circle 147d to the periphery of the cap-down 546. That is to say, widths of the forging portions 546a are larger than those of the bending inducing notches 346f.

Each of the forging portions 546a may have a plane having, for example, a substantially triangular shape, but embodiments of the present invention are not limited thereto. Here, depths of the bending inducing notches 346f may be equal to or different from those of the forging portions 546a.

The cap assembly 140 may be more easily bent in an opposite direction of the electrode assembly 120 by the bending inducing notches 346f and the forging portion 546a when the secondary battery 100 is compressed in a direction perpendicular to the longitudinal direction of the secondary battery 100.

Although the foregoing embodiments have been described to practice the secondary battery of the present invention, these embodiments are set forth for illustrative purposes and do not serve to limit the invention. Those skilled in the art will readily appreciate that many modifications and variations can be made, without departing from the spirit and scope of the invention as defined in the appended claims, and such modifications and variations are encompassed within the scope and spirit of the present invention.

The invention claimed is:

1. A secondary battery comprising:
    a cylindrical can;
    an electrode assembly received in the cylindrical can; and
    a cap assembly for sealing the cylindrical can,
    wherein the cap assembly comprises a cap-down and a sub-plate, the cap-down having a through-hole at a center portion thereof, a mounting groove around the through-hole in a first surface thereof facing the electrode assembly, and a notch for inducing bending which allows the cap assembly to be bent in an opposite direction of the electrode assembly when the cylindrical can is compressed in a direction perpendicular to a longitudinal direction of the cylindrical can, and
    wherein the mounting groove is recessed away from the electrode assembly, and the sub-plate is mounted to the cap-down in the mounting groove.

2. The secondary battery of claim 1, wherein the first surface is substantially planar and
    wherein the cap-down has a substantially planar second surface opposite to the first surface, and the bending inducing notch is formed on the first surface.

3. The secondary battery of claim 1, wherein the bending inducing notch is formed to extend from a center of the cap-down outside of the mounting groove in a radial direction.

4. The secondary battery of claim 1, wherein the bending inducing notch includes 2 to 10 bending inducing notches, which are spaced apart from one another.

5. The secondary battery of claim 4, wherein the cap-down further includes a gas through-hole formed between each of the bending inducing notches.

6. The secondary battery of claim 1, wherein the bending inducing notch is spaced apart from a center of the cap-down.

7. The secondary battery of claim 1, wherein the bending inducing notch is spaced apart from a periphery of the cap-down.

8. The secondary battery of claim 1, wherein the bending inducing notch is spaced apart from each of a center and a periphery of the cap-down.

9. The secondary battery of claim 1, wherein the cap-down further includes a forging portion between the bending inducing notch and a periphery thereof, the forging portion having a greater width than the bending inducing notch.

10. The secondary battery of claim 1, wherein the cap assembly comprises:
a cap-up;
a safety vent having a space between a lower portion of the cap-up and the cap-up; and
a connection ring connected to a periphery of the safety vent,
wherein the cap-down is coupled to the connection ring.

* * * * *